(12) United States Patent
Anderson et al.

(10) Patent No.: US 8,176,879 B1
(45) Date of Patent: May 15, 2012

(54) MACHINE FOR ALTERNATING CONVEYOR BELT LIVESTOCK LOADING

(76) Inventors: Douglas Dean Anderson, Marshall, MN (US); Joshua Dean Anderson, Marshall, MN (US)

( * ) Notice: Subject to any disclaimer, the term of this patent is extended or adjusted under 35 U.S.C. 154(b) by 358 days.

(21) Appl. No.: 12/657,148

(22) Filed: Jan. 14, 2010

Related U.S. Application Data (63) Continuation-in-part of application No. 12/313,526, filed on Nov. 21, 2008, now Pat. No. 7,849,820.

(51) Int. Cl.
*A01K 29/00* (2006.01)

(52) U.S. Cl. .................................................... 119/846

(58) Field of Classification Search ........... 119/842–846
See application file for complete search history.

(56) References Cited

U.S. PATENT DOCUMENTS

| | | | |
|---|---|---|---|
| 3,253,577 A | 5/1966 | Lund | |
| 3,389,690 A | 6/1968 | Jerome | |
| 3,389,780 A | 6/1968 | Jerome | |
| 3,420,211 A | 1/1969 | Hartvickson | |
| 3,452,718 A | 7/1969 | Wight | |
| 3,476,089 A | 11/1969 | Jerome | |
| 3,602,198 A | 8/1971 | Tackett | |
| 3,702,600 A | 11/1972 | Bright et al. | |
| 3,722,477 A | 3/1973 | Weldy et al. | |
| 3,958,536 A | 5/1976 | Crowder | |
| 4,074,658 A | 2/1978 | Mermelstein et al. | |
| 5,325,820 A * | 7/1994 | Briggs et al. .................. | 119/846 |
| 5,469,815 A | 11/1995 | Stross | |
| 5,592,902 A * | 1/1997 | Horton .......................... | 119/846 |
| 5,706,765 A * | 1/1998 | Horton .......................... | 119/846 |
| 5,743,217 A | 4/1998 | Jerome | |
| 5,863,174 A * | 1/1999 | Mola ............................. | 414/505 |
| 5,915,338 A | 6/1999 | Fitzsimmons et al. | |
| 6,109,215 A | 8/2000 | Jerome | |
| 6,305,327 B1 * | 10/2001 | Bounds, Jr. ................... | 119/713 |
| 6,347,604 B1 | 2/2002 | Lapere et al. | |
| 6,447,234 B2 * | 9/2002 | Sinn et al. ..................... | 414/398 |
| 6,454,510 B1 | 9/2002 | Sinn et al. | |
| 6,564,751 B2 * | 5/2003 | Anderson et al. ............. | 119/845 |
| 6,880,488 B1 | 4/2005 | Hall | |
| 6,976,454 B2 * | 12/2005 | Cattaruzzi ..................... | 119/846 |
| 7,281,496 B2 * | 10/2007 | Calabria et al. ............... | 119/845 |
| 2004/0050653 A1 | 3/2004 | Mola | |

* cited by examiner

*Primary Examiner* — Richard Price, Jr.
(74) *Attorney, Agent, or Firm* — David D. Winters (57) ABSTRACT

Machine for alternating conveyor belt livestock loading with pre-loader having conveyor belt, main conveyor section having lift section, top section, and conveyor belt, swing belt section, which may or may not be pivotable, having conveyor belt, and auto-loader section having plurality of conveyor belts.

13 Claims, 8 Drawing Sheets

MACHINE FOR ALTERNATING CONVEYOR BELT LIVESTOCK LOADING

CROSS REFERENCE TO RELATED APPLICATIONS

Continuation in Part of U.S. patent application Ser. No. 12/313,526, filed Nov. 21, 2008, now U.S. Pat. No. 7,849,820.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of livestock handling and more specifically to machine for alternating conveyor belt livestock loading.

As the production and processing of livestock, in particular poultry, has become centralized with thousands of animals raised and housed in one location and hundreds of thousands of animals processed in one location, the need arose to efficiently transport large numbers of animals from point of origin to the processing plants or other locations. Therefore, customized vehicles able to contain the maximum number of animals and loading methods to load the maximum number of animals most quickly with the least amount of stress upon and aggravation of said animals have been devised.

At present, the most common transportation means, particularly for poultry, is a flat bed trailer having cages or coops arranged side by side to form horizontal tiers and vertical columns. And the most popular loading means is a device having a conveyor system having a plurality of different moving belts communicating with the ground, where animals may be herded thereonto, and the interior of a coop where the animals may be deposited thus filling said coop.

These devices generally have a main conveyor system which may be individually raised or lowered, and which transfers animals to another loading conveyor belt which extends into the coop being loaded. This loading conveyor belt is progressively withdrawn as it moves animals into the coop as the coop is filled. Then, the coop is closed and the conveyor system is raised or lowered to the next coop and the process repeated.

When each coop in a column has been loaded, the trailer must be moved to align a new empty column of coops with the loader. This process is repeated until each column is filled.

Although the present state of the art is an improvement over the older methods, present methods also have disadvantages.

In example, when a coop is filled, the loader must be re-oriented to engage the next empty coop, and when a column of coops is full, the trailer must be moved. So, the main conveyor belt must be repeatedly stopped. Thus, the whole loading process requires constant stopping and starting. This causes excess wear and tear on the machine, excess energy consumption, and excess stress upon the animals being loaded. In addition, every time a column of coops is filled, the trailer must also be moved, further slowing the work.

In contrast to the present state of the technology, the herein taught art incorporates means to immediately load coops disposed side by side in adjacent columns. Thus, it cuts, by at least half, the number of times a trailer being loaded must be moved, thereby greatly reducing the time used. In additional contrast, the instant art is contrived so that as it is re-oriented from full coops to empty coops, the main conveyor belt may continue to run.

Thus, this new technology reduces the time required to load a trailer and reduces the stress on animals being loaded, thereby advancing the art of loading livestock onto trailers.

BRIEF SUMMARY OF THE INVENTION

The primary object of the invention is to accomplish faster loading of livestock, especially poultry, into cages or coops arranged in columns and tiers on a semi-trailer.

Another object of the invention is loading of livestock using a series of conveyor belts permitting significantly more continuous operation of the main conveyor belt.

Another object of the invention is to minimize the stress and disturbance on livestock being loaded into cages or coops.

A further object of the invention is livestock transfer by alternating conveyor belts and/or a plurality of conveyor belts simultaneously.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for loading livestock via alternating conveyor belts using a pre-loader having a conveyor belt, a main conveyor section having a conveyor belt, a lift section, a top section, and a swing belt section also having a conveyor belt, plus an auto-loader section having a plurality of substantially side by side conveyor belts, or, in an alternative embodiment, a dividing element communicating with a drop belt section.

In accordance further with a preferred embodiment of the invention, there is disclosed a process for livestock loading comprising the steps of: herding livestock onto a pre-loader which transfers the livestock to a main conveyor section having a top section, which transfers the livestock to a swing loader section which transfers the livestock to one auto-loader section extendable or retractable conveyor belt, then swings to transfer livestock to an alternate auto-loader section extendable or retractable conveyor belt, or which transfers livestock to a plurality of auto-loader conveyor belts simultaneously.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LIST OF COMPONENTS

10 Loader
12 Pre-loader
14 Main conveyor section
16 Lift section
18 Top section
20 Major assembly
22 Swing belt section 24 Auto-loader section
26 Lift cylinder
28 Trailer
30 Leveler
32 Extension cylinder
34 Semi-trailer
36 Coop
38 Tier
40 Take up section
42 Rollers
44 Weighted rollers
46 Weight
48 Belt slack
50 Extension cylinder
52 Column
54 Livestock (fowl)
56 Pivot point
58 Conveyor belt
60 Hitch
62 Trailer frame
64 Wheels
66 Main section pivot point
68 Ground
70 Top section end
72 Swing belt section end
74 Auto-loader section conveyor belt
76 Swing belt section conveyor belt
78 Pre-loader conveyor belt
80 Swing belt section swivel
82 Swing belt section caster
84 Swing belt section track
86 V-belt assembly
88 V-belt assembly apex
90 V-belt assembly conveyor section
92 V-belt assembly conveyor belt
94 V-belt assembly rollers
96 V-belt assembly spaced apart ends
98 V-belt section linear axis
100 V-belt assembly support frame
102 Support frame pivot point
104 Frame end
106 Opposing frame end
110 Major cross piece
112 Major cross piece end
114 Longitudinal strut
116 Minor cross piece
118 Minor cross piece end
122 Drop section
124 Drop section conveyor belt
126 V-belt section frame
128 Drop belt section end
132 Dividing element
134 Swing belt section end obstructed portion
136 Dividing element spaced apart ends
138 Dividing element apex
140 Dividing element side
142 Swing belt section end unobstructed portion (142)
144 V-belt pivot cylinder attachment
146 V-belt pivot cylinder
148 V-belt hinge
150 Frame structure
152 V-belt assembly base
154 V-belt assembly base flange
158 V-belt assembly base plate flange pivot point
Distance X
Arc B
Direction A

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The instant art deals with structures using arrangements of conveyor belts and coordinating of the speeds of some relative to others, all of which are well known in the art. Therefore such structures, types and arrangements of conveyor belts and methods of coordination of various conveyor belt elements will not be described in meticulous detail. Also, one may readily appreciate that automated livestock loaders may comprise elements having nothing to do with the inventive steps of the instant art, in example walls and/or roof covers, which, for clarity, will therefore not be depicted nor described in great detail.

When used in reference to conveyor belts, the term "variable" may refer to length of conveyor belt, speed of conveyor belt, extension or retraction of conveyor belt and/or direction of travel of conveyor belt, as apparent from the context.

Figures 1, 1A:
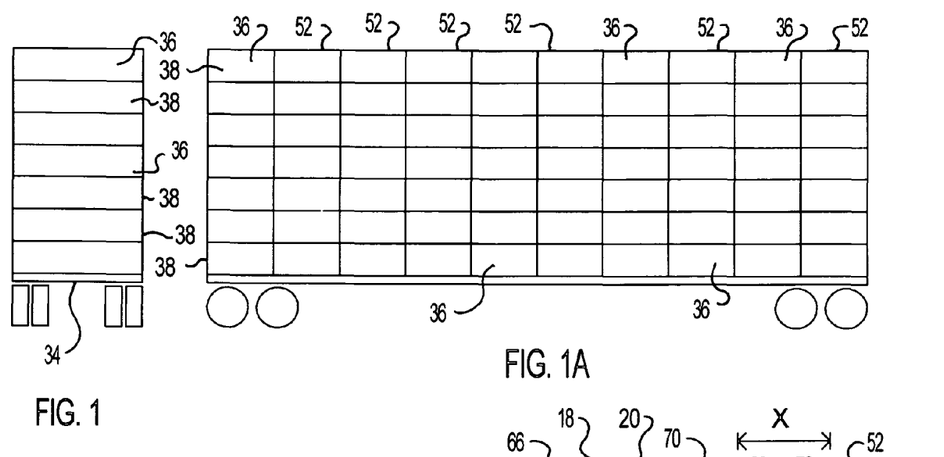
FIG. 1 is a back view of a semi-trailer.
FIG. 1A is a side view of a semi-trailer.

The terms "lift cylinder," "extension cylinder," "pivot cylinder," and "leveling cylinder" are understood to refer to extendable or retractable hydraulic or pneumatic cylinders. In addition, those well versed in the art will readily appreciate that other means of accomplishing the functions of hydraulic and/or pneumatic cylinders are known and may be exploited in the instant art. In example, elements extended by arrangements of racks and pinions, racks and worm gears, screw jacks, etc. are known and may be substituted Looking now at FIG. 1 and FIG. 1A, one sees a semi-trailer (34) especially adapted to transport livestock, in particular, poultry. The trailer (34) has a plurality of coops (36) arranged side by side to comprise substantially horizontal tiers (38) stacked one on top of the other forming substantially vertical columns (52). One may readily appreciate that these coops (36) may be of any type well known in the art and may include entry doors that open for loading. The coops (36) may also comprise partitions that open or close to divide the coops (36) into discrete sections. In addition, one may readily appreciate that the coops (36) may be substantially permanently attached to the semi-trailer (34).

Figure 2:
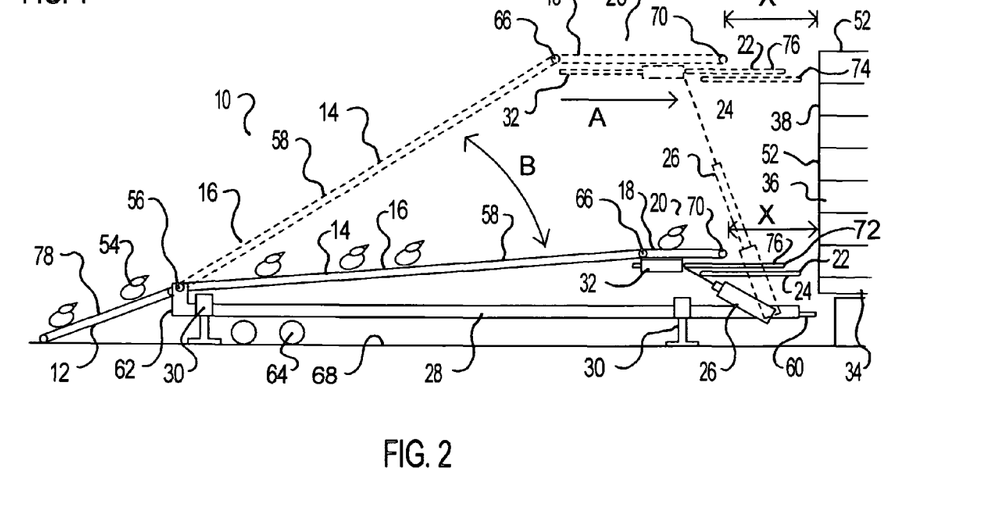
FIG. 2 is a view of the device and a semi-trailer.
Figures 2A, 2B:
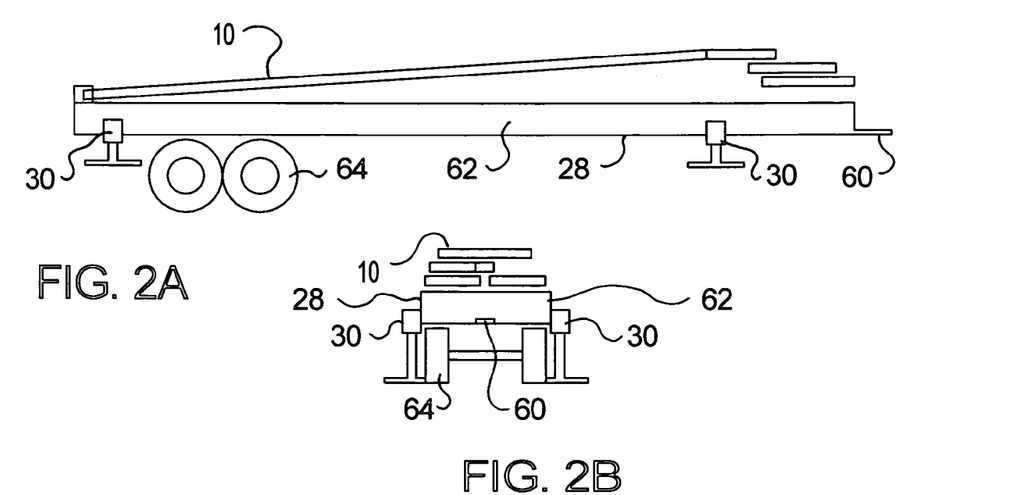
FIG. 2A is a side view of the device.
FIG. 2B is a front view of the device.

Turning now to FIG. 2, FIG. 2A, and FIG. 2B, one sees a machine (10), for loading livestock (54), in particular poultry, into coops (36) on the trailer (34) in the disposition previously described. The machine (10) has a trailer (28) having a frame (62), a hitch (60), levelers (30), and wheels (64) such that the trailer (28) may be moved from place to place and then oriented so that the loading machine (10) is in operative position, relative to the semi-trailer (34) comprising columns (52) and tiers (38) of coops (36) as previously described.

Looking further at FIG. 2, one sees that the machine (10) also comprises a main conveyor section (14) having a conveyor belt (58). Also, one notes that the main conveyor section (14) comprises a lift section (16) and a top section (18) with the conveyor belt (58) traversing the lift section (16) and the top section (18).

Figure 4:
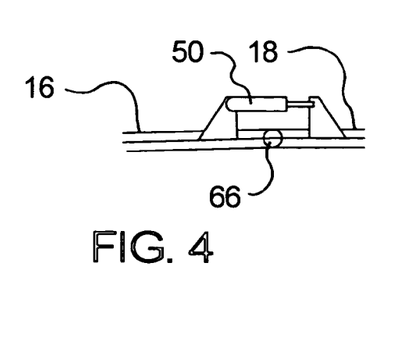
FIG. 4 is a view of articulation means.
Figure 4A:
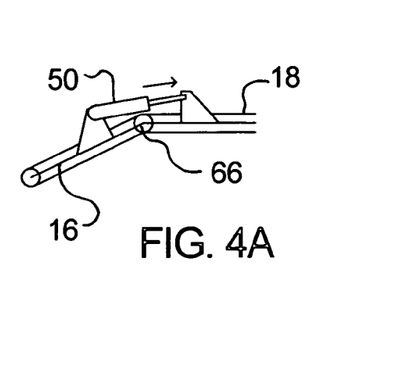
FIG. 4A is a view of articulation means.

The top section (18) is oriented substantially horizontally, the lift section (16) and the top section (18) having a pivot point (66) there-between, so that the lift section (16) and the top section (18) are articulated, each relative the other. FIGS. 4 and 4A serve as examples wherein the lift section (16) and the top section (18) may have a leveling cylinder (50) anchored therebetween, so that extension or retraction of the leveling cylinder (50) will cause the lift section (16) and the top section (18) to pivot each relative the other. Thus, the top section comprises the pivot point (66) and an end (70) opposite the pivot point (66). Further, one notes that in operative position, the top section (18) is substantially level and the top section end (70) is at an optimal distance from the column of coops (52), distance X. Also shown in FIG. 2 is an extension cylinder (32) communicating with the top section (18) whereby the top section (18) may be extended or retracted.

Turning yet again to FIG. 2, one sees that the main conveyor section (14) communicates with the trailer (28) and trailer frame (62) at a pivot point (56) at the end of the main conveyor section (14) opposite the main conveyor section pivot point (66), and by means of a lift cylinder (26) attached to the trailer frame (62) and to the main conveyor (14). In addition, one also sees that the loader (10) comprises a major assembly (20) having the top section (18) of the main conveyor section (14), a swing belt section (22) having a conveyor belt (76) and an end (72), and an auto-loader section (24) having at least one conveyor belt (74).

The top section (18), swing belt section (22) and auto-loader section (24) are integral structures having independently variable, as to speed of travel, direction of travel, extension, retraction, or length, conveyor belts (58, 76, 74). Also, one notes a pre-loader (12). This is also an independent structure having a conveyor belt (78) independently variable in speed of travel, direction of travel, extension, retraction, or length relative other conveyor belts (58, 74, 75). It communicates with the ground (68) and the end of the main conveyor section (14) proximal the pivot point (56). Further, one notes that in operative position, the top section (18) is substantially level and the top section end (70) is at an optimal distance from the column of coops (52), which distance is distance X.

Attending again to FIG. 2, one sees that the lift cylinder (26) may be extended causing the main conveyor section (14) to rise while pivoting at pivot point (56) thusly describing an arc as indicated by double pointed arrow B. One may readily appreciate that by retraction of the lift cylinder (26), the main conveyor (14) may be lowered along the same course indicated by double pointed arrow B.

Now one may readily appreciate that as the main conveyor section (14) is lifted and pivoted about pivot point (56) by lift cylinder (26) thusly describing the arc (B), the distance X from the top section end (70) to the column (52) of coops (36) will tend to increase and the orientation of the top section (18) will tend to vary from substantially horizontal. However, the top section (18) is extendable in direction A by extension cylinder (32) and the top section (18) is articulated relative to the lift section (16) by leveling cylinder (50).

Therefore, one may readily appreciate that by proper extension of and articulation of the top section (18), the top section (18) may be maintained in substantially horizontal position and the distance X from the top section end (70) to the column (52) of coops (36) may be kept substantially constant. In addition, one may readily appreciate that said coordination may be affected by well known control systems for cylinders (26, 32, 50). In example, by systems comprising computers, servo mechanisms, control and feed back devices and circuitry, etc., by human operators or combinations of any of the above.

In addition, one may readily appreciate that as the main conveyor section (14) is lowered by retraction of lift cylinder (26), then the leveling cylinder (50) and extension cylinder (32) may be retracted in coordinated manner to maintain the top section (18) in a substantially horizontal orientation and maintain distance X substantially constant by any of the same aforementioned means or combinations.

Figure 3:
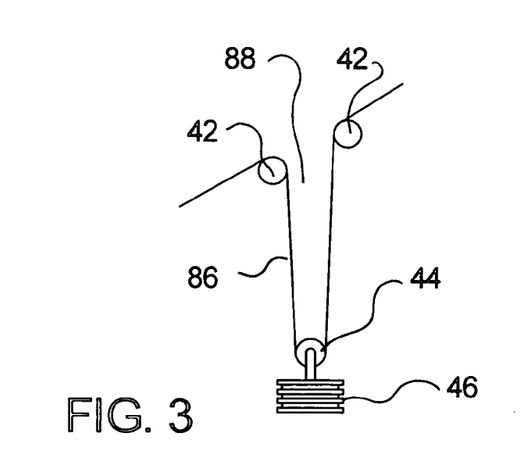
FIG. 3 is a view of slack take up means
Figure 3A:
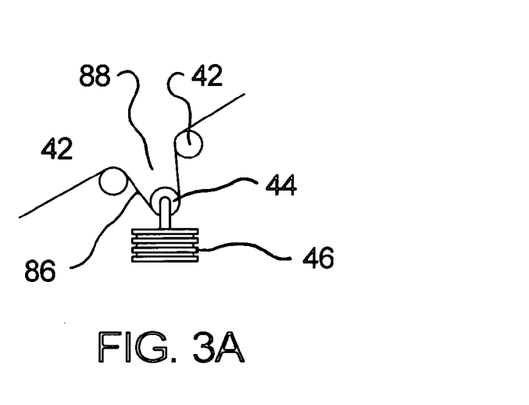
FIG. 3A is a view of slack take up means.

Now, one may readily appreciate that the extension and/or retraction of the top section (18) of the main conveyor section requires means to take up or play out slack in the main conveyor section conveyor belt (58), as in FIG. 3 and FIG. 3A. Here, one sees that the main conveyor section (14) may comprise a gap (88) defined by rollers (42) over which the main conveyor belt (58) may travel, thusly extending a portion of said belt (58) through the gap (88) to comprise a slack loop (86) held taught by a weight (46) and a weighted roller (44). Therefore as the top section (18) is extended or retracted the slack loop (86) may increase in size or decrease in size as necessary. Further, those well versed in the art will readily appreciate any conveyor belt comprised by the instant art may exploit the above slack play out and take up means and that the swing belt section (22), the auto-loader section (24) and/or the auto loader section conveyor belts (74) or supporting structures, may communicate with extension cylinders so as to be extendable or retractable in the manner of the top section (18).

Figure 5:
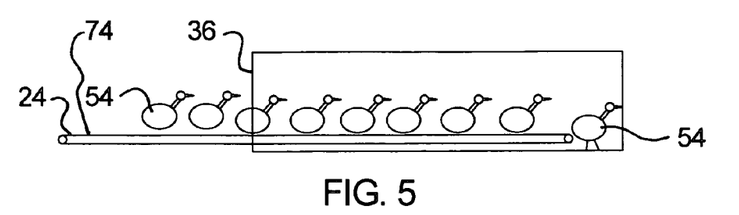
FIG. 5 is a view of auto-loader and coop.
Figure 5A:
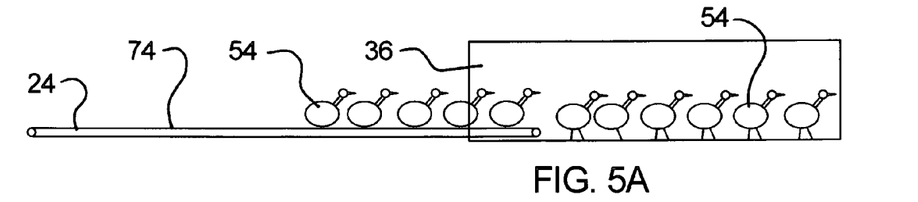
FIG. 5A is a view of auto-loader and coop.

Turning now to FIG. 5 and FIG. 5A, one sees a coop (36) with an auto-loader section conveyor belt (74) extending thereinto. Upon the auto-loader section conveyor belt (74) one notes livestock (54), in this case fowl, and one may readily appreciate that the livestock (54) may be transported into the coop (36) as the said livestock are cycled off the end of the moving auto-loader section conveyor belt (74). Also, one may readily appreciate that as livestock (54) are deposited in the coop (36), the auto-loader section (24) conveyor belt (74) may be progressively withdrawn from the coop (36) as the coop (36) is thusly filled.

Turning back to FIG. 2, one may now readily appreciate that these livestock (54), may be herded onto the pre-loader (12) and transported by conveyor belt (58) to the main conveyor (14) where the animals (54) may then be moved up the lift section (16) to the top section (18) by conveyor belt (58). The conveyor belt (58) then transports the animals (54) off the end (70) of top section (18) and deposits them upon the swing belt section (22). Then movement of swing belt section conveyor belt (76) moves the animals (54) to the swing belt section conveyor belt end (72) and propels them (54) off the swing belt section conveyor belt end (72) depositing them onto the auto-loader (24) whereupon they are loaded into a coop (36) as previously described.

Now one may readily appreciate that the working elements of the loader (10) are carefully contrived so that the movement of animals by conveyor belts and the transfers of animals from one conveyor to another and/or from a conveyor belt to the interior of a cage or coop (36) are smoothly achieved with a humane minimum of pushing or shoving or other raw force.

In addition, due to certain factors, in example the volitional nature of livestock (54) and their freedom, albeit limited, to move at virtually any step in the loading process, the livestock (54) locations on various conveyor belts and their depositions from locations on one conveyor belt to locations on other conveyor belts may appear to be random.

Looking again at FIG. 2, one notes that the major assembly (20) comprises the top section (18) from which depends the swing belt section (22) and the auto-loader section (24), with the swing belt section (22) being disposed between the auto-loader section (24) and the top section (18).

Figures 6, 7, 8, 8A, 8B, 8C:
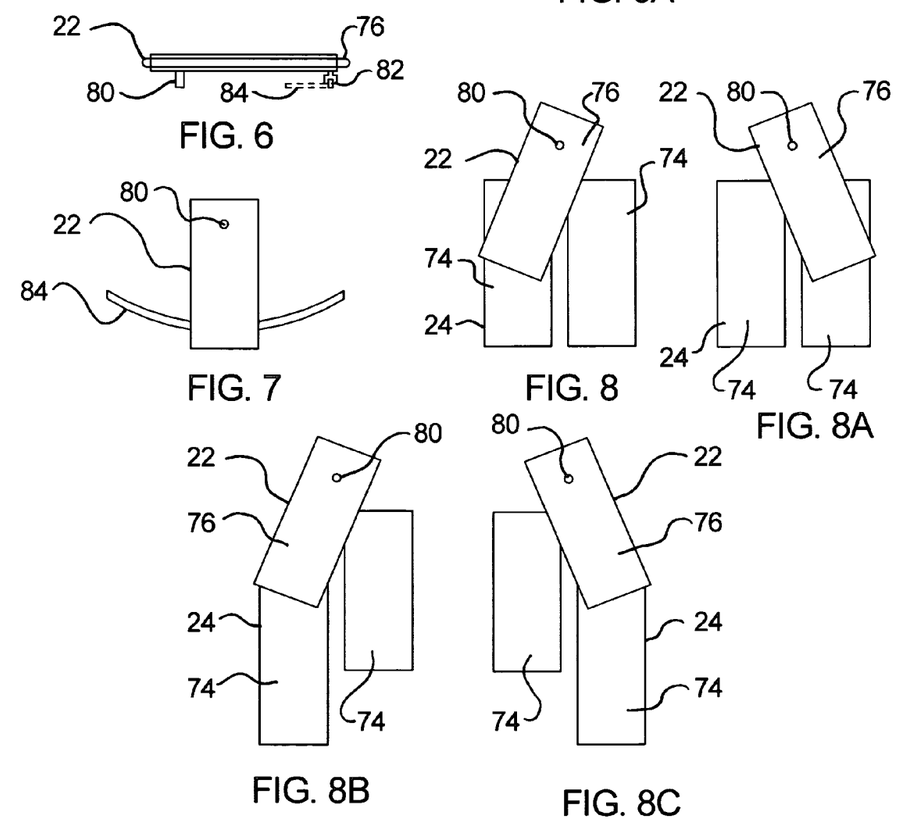
FIG. 6 is a side view of a swing belt section.
FIG. 7 is a top view of a swing belt section.
FIG. 8 is a top view of swing belt section and auto-loader.
FIG. 8A is a top view of swing belt section and auto-loader.
FIG. 8B is a top view of swing belt section and auto-loader.
FIG. 8C is a top view of swing belt section and auto-loader.

Turning to FIG. 6 and FIG. 7, one notes that the swing belt section (22) comprises a swivel (80) and a caster (82) disposed in an arcuate track (84), the swivel (80) and the caster (82) being oriented proximal opposite ends of the swing belt section (22). Further, one sees that the swing belt section has a conveyor belt (76).

Turning now to FIG. 6, FIG. 7, FIG. 8, FIGS. 8A, 8B, and 8C, one sees that the auto-loader section (24) comprises a plurality of conveyor belts (74) disposed essentially side by side, and that said conveyor belts (74) are independently extendable and/or retractable. In addition, one sees that the swing belt section (22) may be swung or pivoted about the swivel (80) while the track (84) guides and/or supports the swing belt section (22) as the swing belt section caster (82) engages the track (84). Thus, one may readily appreciate that the swing belt section end (72) may be disposed above either one or the other auto-loader section conveyor belt (74).

Thus, one may readily appreciate that by loading one coop (36) extending and retracting one of the conveyor belts (74) as previously described, and by then swiveling the swing belt section (22) to communicate with the adjacent auto-loader section conveyor belt (74) which in like manner may be extended into and withdrawn from the next coop (36), the coops (36) in adjacent columns (52) in the same tier (38) may be loaded as previously described without the time consuming process of relocating the semi-trailer (34) upon which the coops (36) are loaded.

Turning yet again to FIG. 2, FIG. 5, FIG. 5A, FIG. 6, FIG. 7, FIG. 8, FIG. 8A, FIG. 8B, and FIG. 8C, one may readily appreciate that due to the previously described variability of the conveyor belts as to speed of travel, direction of travel, extension, retraction, or length, a loading process may be achieved wherein the main conveyor section conveyor belt (58) may run substantially continuously.

In example, during periods between off-loads, as when the swing belt section (22) is being swiveled, or when the semi-trailer (34) is being moved, or when the main conveyor section (14) is being raised or lowered to reorient the major assembly (20), and the auto-loader section (24), the main conveyor section conveyor belt (58) may continue to deposit livestock (54) upon the swing belt section (22). This section (22) has sufficient capacity to, by judicious manipulation of the speed of the swing belt section conveyor belt (76), permit livestock to accumulate on the swing belt section end (72) until coop (36) loading may again commence.

Now one may readily appreciate that the sundry elements comprising the machine (10) may communicate with each other and be supported by various types of frameworks. Said framework types and dispositions are well known and easily contrivable by those skilled in the art and are not claimed and therefore are not depicted in the figures or the descriptions for the sake of clarity and/or brevity. In addition, one may also readily appreciate that controls for the operation of the various elements of the machine (10) may be placed at any number of convenient locations about the machine (10) and that structures to house and/or support operators may be similarly disposed about the machine (10), many effective dispositions of said controls and operator housings being known. No particular controls, housings, or dispositions are claimed. Therefore, none are depicted in the figures nor described in detail.

Further, one may readily appreciate that all elements of the machine (10) may be arranged on the trailer (28) so that all may be transported from place to place and the machine (10) configured for transport at one location with minimum of time and effort, and set up for operation at another location with minimum of time and effort. Said dispositions of machinery are well known and easily contrived by those skilled in the art, but none are claimed therefore none are depicted in the drawings nor described.

FIG. 9, FIG. 9A, FIG. 9B, FIG. 9C, and FIG. 9D show an alternative embodiment of the instant art, having common elements and operating according to principles previously described, having a dividing element (132) communicating with the swing belt section (22). The dividing element (132) is configured so that a portion (134) of the swing belt section end (72) is obstructed so that no livestock (54) conveyed by the swing belt section conveyor belt (76) toward the swing belt section end (72) may communicate therewith. Further, FIG. 9, FIG. 9A, FIG. 9B, and FIG. 9C show that the dividing element (132) comprises an essentially V-shape with spaced apart ends (136) proximal the swing belt section end (72) and substantially planar sides (140) extending from the ends (136) to an apex (140) opposite the ends (136) and disposed proximal the axis of the swing belt section (98). Further, said sides (140) are oriented substantially perpendicularly to the swing belt section (22).

Now, one skilled in the art may readily appreciate that some of the livestock (54) conveyed toward the swing belt section end (72) by the swing belt section conveyor belt (76) will contact either one dividing element side (140) or another whereupon the livestock (54) will be guided and conveyed toward one unobstructed swing belt section end portion (142) or another by combination of the movement imparted to said livestock (54) by the swing belt section conveyor belt (76) and the obstructive properties of the dividing element sides (140). Also, the dividing element sides (140) may comprise any of sundry known materials having low coefficients of friction to facilitate movement of livestock in contact with said sides (140). In addition, though the dividing element (130) depicted has a V-shape, those skilled in the art will readily appreciate that other shapes may function well, if not equally.

Figure 9:
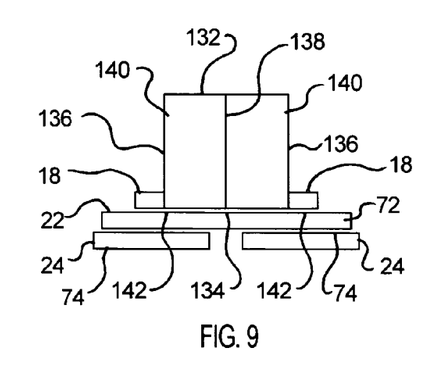
FIG. 9 is a front view of an alternative embodiment.
Figure 9A:
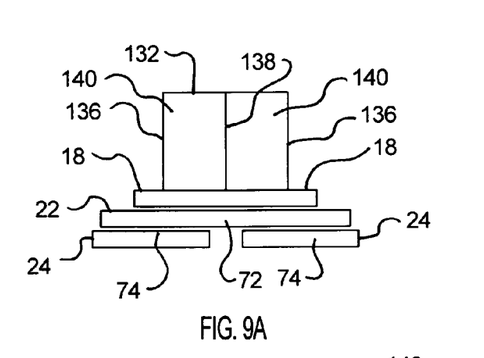
FIG. 9A is a back view of the alternate embodiment.
Figure 9B:
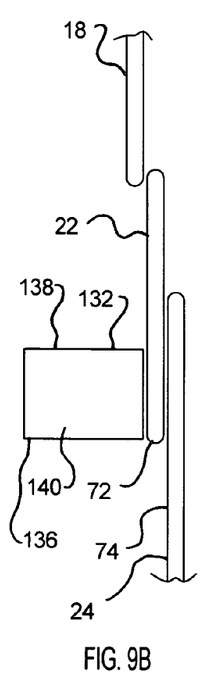
FIG. 9B is a side view of the alternate embodiment.
Figure 9C:
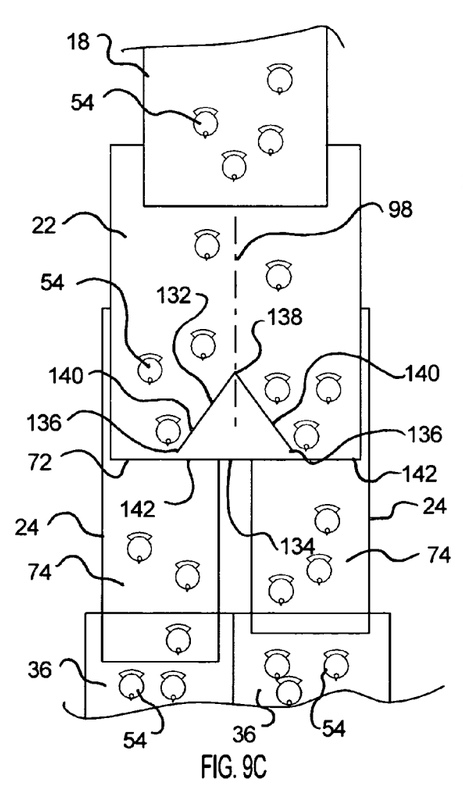
FIG. 9C is a top view of the alternate embodiment.

Thus, one may understand that a quantity of livestock (54), in example a rafter of turkeys, conveyed by the swing belt section conveyor belt (76) are divided into alternate groups, in example rafters of turkeys, each communicating with different swing belt section end unobstructed portions (142).

Further, FIG. 9C shows that a plurality of unobstructed swing belt section end portions (142) may communicate with a plurality of auto-loader section conveyor belts (74) essentially simultaneously and thus a plurality of coops (36) may be loaded essentially simultaneously.

Figure 9D:
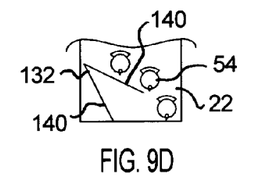
FIG. 9D is a top view of an orientation of elements of the machine.
Figure 9E:
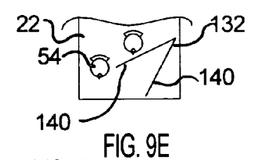
FIG. 9E is a top view of an orientation of elements of the machine.
Figure 9F:
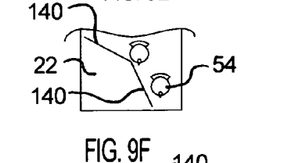
FIG. 9F is a top view of an orientation of elements of the machine.
Figure 9G:
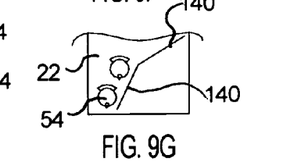
FIG. 9G is a top view of an orientation of elements of the machine.
Figure 9H:
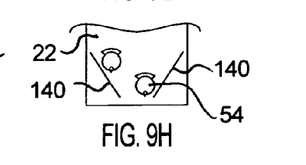
FIG. 9H is a top view of an orientation of elements of the machine.

FIG. 9D shows that the dividing element (132) may be pivoted about one or more axes. FIG. 9E shows that the dividing element (132) may be pivoted about one or more axes. FIG. 9E shows that the dividing element (132) may be pivoted about one or more axes. FIG. 9F, FIG. 9G, and FIG. 9H show that one or more dividing element sides (140) may be pivoted about one or more axes. Thusly, by manipulation of the dividing element (132) and/or dividing element sides (140), livestock (54) may be blocked from communication with particular portions (134) of the swing belt section (22). Thus, one skilled in the art may readily appreciate that by blocking communication of livestock (54) with portions of the swing belt section (22), livestock (54) may be loaded into one coop (36) only.

Figure 9I:
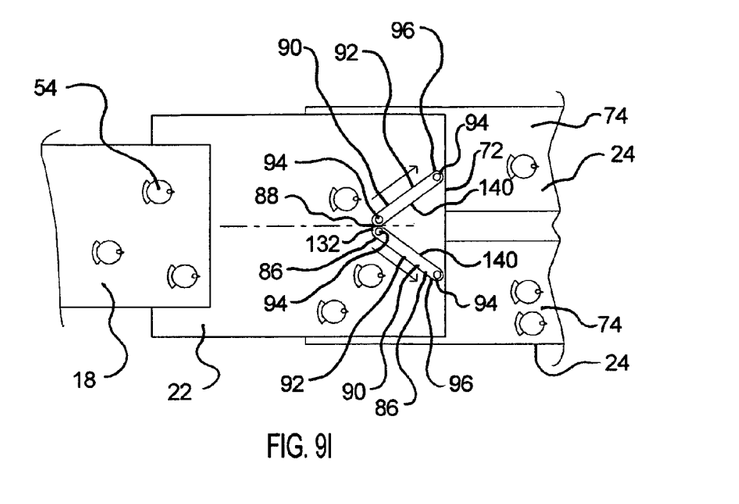
FIG. 9I is a top view of an alternate embodiment.

FIG. 9J shows an embodiment of the invention according to principles of the instant art wherein livestock (54) are conveyed from the top section (18) to the swing belt section (22) and then to the auto-loader section (24). And wherein the dividing element (132) is a V-belt assembly (86) and the dividing element sides (140), apex (138), and paced apart ends (136) are comprised by at least one or more V-belt assembly conveyor sections (90), having conveyor belts (92), disposed such that the V-belt assembly (86) comprises an apex (88), oriented proximal the swing belt section linear axis (98), and spaced apart V-belt assembly ends (96). FIG. 9B and FIG. 9C additionally show that the spaced apart V-belt assembly ends (96) may be oriented proximal the swing belt section end (72).

Also, it may be seen that the V-belt assembly conveyor sections (90) comprise rollers (94) which may be caused to rotate in such a manner that the V-belt assembly conveyor belts travel around the rollers (94), in directions indicated by the depicted arrows. Further, the direction and speed of said travel is independently variable for all V-belt assembly section conveyor belts (92). Further, it may be easily understood that there may be minimum clearance necessary between the V-belt assembly (86) and the swing belt section (22) to allow simultaneous and/or independent movement of the V-belt assembly conveyor belts (92) and the swing belt section conveyor belt (76).

FIG. 9, FIG. 9A, FIG. 9B, and FIG. 9C additionally demonstrate that the dividing element sides (140), and thus the V-belt assembly conveyor sections (90) if the dividing element (132) is thusly embodied, are disposed substantially perpendicularly to the swing belt section (22).

As previously stated, the instant art comprises framework and other structures which support the operative elements, which framework is not described in detail as it is of types well known in the art and is not claimed. Thus, it may be readily appreciated that the dividing element (132), or the V-belt assembly (86) if the dividing element (132) is thusly embodied, must be supported by such framework or other structure, types of which are well known and easily contrived by those well versed in the art. Therefore such elements are not described.

Figure 10:
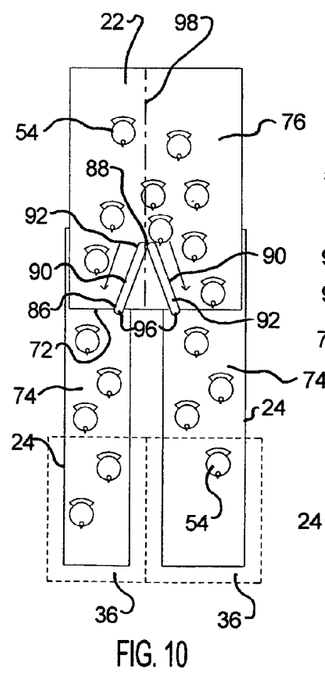
FIG. 10 is a top view of the alternate embodiment.
Figure 10A:
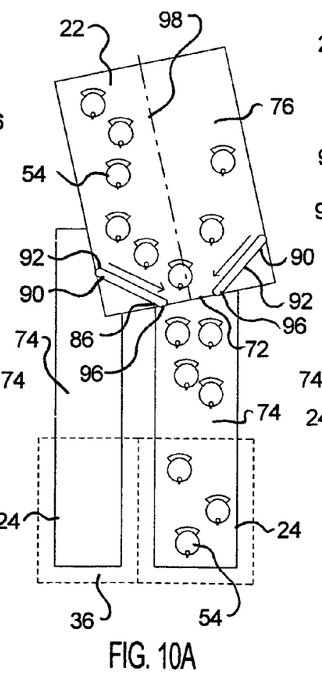
FIG. 10A is a top view of the alternate embodiment.
Figure 10B:
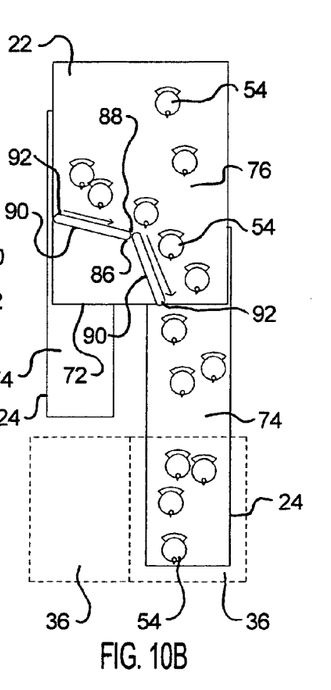
FIG. 10B is a top view of the alternate embodiment.

FIG. 10, FIG. 10A, and FIG. 10B show that the auto-loader section conveyor belts (74) may be extended into coops (36) as previously described. In addition, the V-belt assembly conveyor belts (92) may travel in the direction from the V-belt assembly apex (88) to the swing belt section end (72), as indicated by arrows.

FIG. 10 shows that a portion of the livestock (54) having been apparently randomly transferred to a particular area of the swing belt section (22) and transported toward the swing belt section end (72) by the swing belt section conveyor belt (76) will encounter the V-belt assembly (86) at some points along either of the V-belt conveyor sections (90) conveyor belts (92). Thereupon, the livestock (54) will be urged toward the swing belt section end (72) and the V-belt assembly spaced apart ends (96) by the V-belt conveyor section conveyor belt (92) in combination with the swing belt section conveyor belt (76). The V-belt conveyor section conveyor belts (92) may be driven by a power source such as a motor or they may be free moving, movement transferred from the swing belt section conveyor belt to the livestock (54) and then to the V-belt assembly conveyor section conveyor belts (92) by contact therewith being sufficient to cause them to move. In addition, FIG. 10 shows that the V-belt assembly (86) obstructs a portion of the swing belt section end (72) so that livestock are prevented from communication therewith. Thus, by the combination of blocking a portion of the swing belt section end (72) and urging of livestock either to one side of the swing belt section conveyor belt (76) or the other, the V-belt assembly (86) apparently randomly divides the livestock (54) such that they are apparently randomly apportioned to communicate with different portions of the swing belt section end (72), which portions communicate with either one auto-loader section conveyor belt (74) or another.

Now, from FIG. 10, one may see that the swing belt section conveyor belt (76) may simultaneously communicate with a plurality of auto-loader section conveyor belts (74). Therefore, it is readily apparent that livestock (54), having been deposited on the swing belt section (22) as in previous embodiments, will travel along the swing belt section (22) and be transferred to either one auto-loader section conveyor belt (74) or the other (74). Further, it may be readily appreciated that livestock (54) disposed proximal the swing belt section linear axis (98) will encounter the V-belt assembly apex (88) whereupon said livestock (54) will contact either one V-belt assembly conveyor belt (92) or another. Whereupon, due to the motion of the conveyor belts (92), the livestock will either be urged towards one side of the swing belt section (22) or to the other side. From there, it is transferred to either one auto-loader section conveyor belt (74) or the other. Therefore, it may be readily appreciated that by separating livestock (54) traveling upon the swing belt section (22), as previously described, thusly transferring said livestock (54) to a plurality of auto-loader sections (24) simultaneously, more than one coop (36) may be loaded at the same time.

Those well versed in the art will readily note that it may occur that livestock (54) conveyed by the swing belt section (22) may contact the V-belt assembly apex (88) at a point whereupon said livestock (54) might encounter a plurality of V-belt assembly conveyor belts virtually simultaneously. In such case, the direction of travel of said conveyor belts (92) will prevent said livestock (54) from being pinched therebetween, but will urge said livestock away from the apex (88) so that the livestock (54) will eventually be propelled to one side of the swing belt section (22) or the other. Further, it may be readily appreciated that no arrangements or operations of any elements of the instant art exert any force upon any livestock (54) not well within humane limits.

Therefore, since loading two coops (36) at once may be accomplished in less time than loading first one coop (36) and then another, it may be readily appreciated that the advantages of the instant art are enhanced by the previously described alternative embodiment.

Should one coop (36) become full before the adjacent one, the V-belt assembly conveyor sections (90) may be pivoted about at least one axis and independently of one another, as in FIGS. 10A and 10B. Also, the V-belt section (86) may be pivoted as a unit, as in FIGS. 13A and 13B. Together these comprise V-belt assembly conveyor section (90) configurations to direct livestock (54) to various areas of the swing belt section (22). Further, the swing belt section (22) may be pivoted, independently of the auto-loader section (24), about at least one axis to communicate with only one auto-loader section conveyor belt (74) or the other, as in FIG. 10A. In this figure, the V-belt assembly sections (90) have been pivoted and the V-belt assembly conveyor belts (92) travel direction, as depicted by arrows, has been adjusted to urge livestock (54) traveling along the swing belt section (22) toward the center of said swing belt section (22). In particular, the V-belt conveyor sections (90) serve both to block the livestock (54) from communication with portions of the swing belt section end (72) and to urge livestock towards the V-belt assembly spaced apart ends (96) thusly allowing livestock (54) to communicate with only the center portion of the swing belt section end (72). Thus, it may be readily appreciated that the swing belt section (22) may be pivoted so that the livestock (54) will be deposited onto one auto-loader section conveyor belt (74) but not the other, as in FIG. 10A.

FIG. 10B shows that the V-belt assembly conveyor sections (90) may be pivoted independently of one another into such configuration that livestock (54) traveling upon the swing belt section (22), according to their random depositions thereupon, may contact portions of the V-belt conveyor sections (90) along the V-belt conveyor section conveyor belts (92). In consequence, due to the direction of travel of the V-belt conveyor section conveyor belts (92) and the swing belt section conveyor belt (76), the livestock (54) may be urged to one side of said swing belt section (22) Thus, the V-belt conveyor sections obstruct a portion of the swing belt section end (72) and block the livestock (54) from communication with a particular portion of the swing belt section end (72). Therefore, said livestock (54) may be transferred to only one auto-loader section conveyor belt (74), thusly loading livestock (54) into one coop (36) only. Therefore, it may be understood that if one coop (36) should be filled before an adjacent one, loading of the full coop (36) may be stopped while the other coop (36) is filled.

In addition, FIG. 10, FIG. 10A, and FIG. 10B demonstrate that various dispositions of V-belt assembly conveyor section conveyor belts (92) along with dimensions and orientations of swing belt section (22) elements and auto-loader section (24) elements have been contrived so that no livestock (54) is transferred anywhere but to another conveyor belt or into a coop (36).

Those well versed in the art, in consideration of FIG. 9, FIG. 9B, FIG. 9C, FIG. 9D, FIG. 9E, FIG. 9F, FIG. 9G, FIG. 10, FIG. 10B, FIG. 13A, and FIG. 13B, will readily appreciate that livestock may be urged toward one side of the swing belt section (22) but not another to be transferred to one auto-loader section conveyor belt (24) but not any other or livestock (54) may be urged to different portions of the swing belt section (22) substantially simultaneously thus livestock (54) may be transferred to a plurality of auto-loader section conveyor belts (74) substantially simultaneously. Thus it may be easily understood that the swing belt section (22) needs not be pivoted in order that livestock (54) be transferred to only one auto-loader section conveyor belt (24) or to a plurality of auto-loader section conveyor belts (74) substantially simultaneously. Therefore, as in FIG. 13, FIG. 13A, and FIG. 13B, a stationary, or non-pivoting, drop belt section (122) having a conveyor belt (126), variable independently of all other conveyor belts as to speed of travel, length of travel, or direction of travel, extension, retraction, or length and an end (128) may be substituted for the pivotable swing belt section (22) depicted in FIG. 8, FIG. 8A, FIG. 8B, FIG. 8C, and FIG. 10A or in any other embodiment of the instant art wherein the orientations of dividing element (132) and or elements thereof, especially as embodied by V-belt assembly (86) and/or V-belt assembly conveyor sections (90) allow livestock (54) be transferred to one side of a conveyor belt section but not the other side of a conveyor belt section or to both sides of a conveyor belt section substantially simultaneously intermediate the top section (18) and the auto-loader section (24), in example, the swing belt section (22) or the drop belt section (122).

In addition, FIG. 10B demonstrates that the auto-loader section conveyor belts (74) may be extended into or drawn out of the coops (36) independently so that one auto-loader section conveyor belt (74) may extend into one coop (36) while another auto-loader section conveyor belt (74) does not extend into any coop (36).

Figure 11:
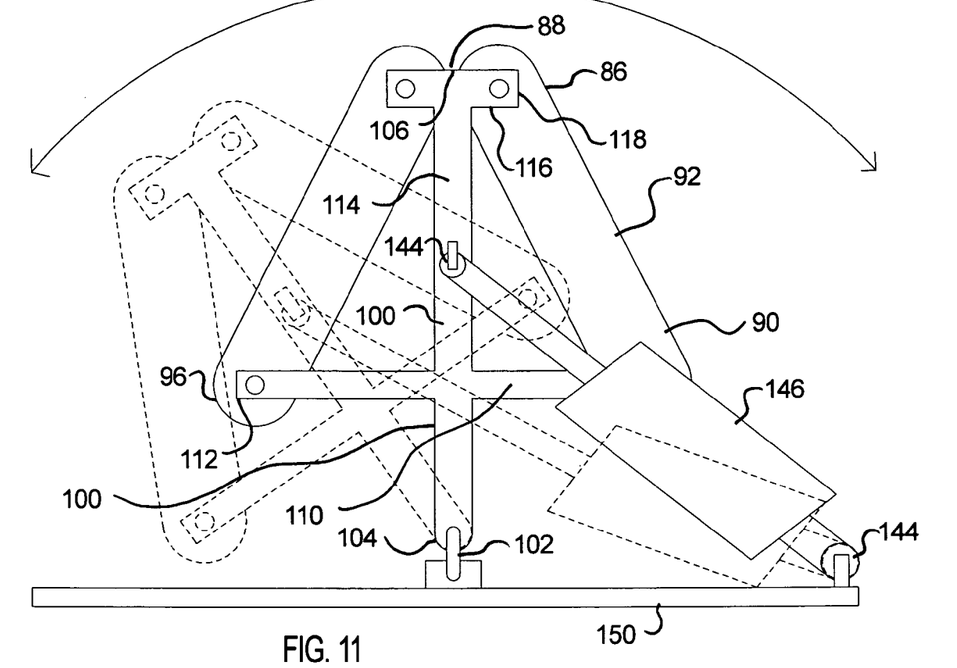
FIG. 11 is a top view of a pivotable V-belt assembly and supporting structure.
Figure 12:
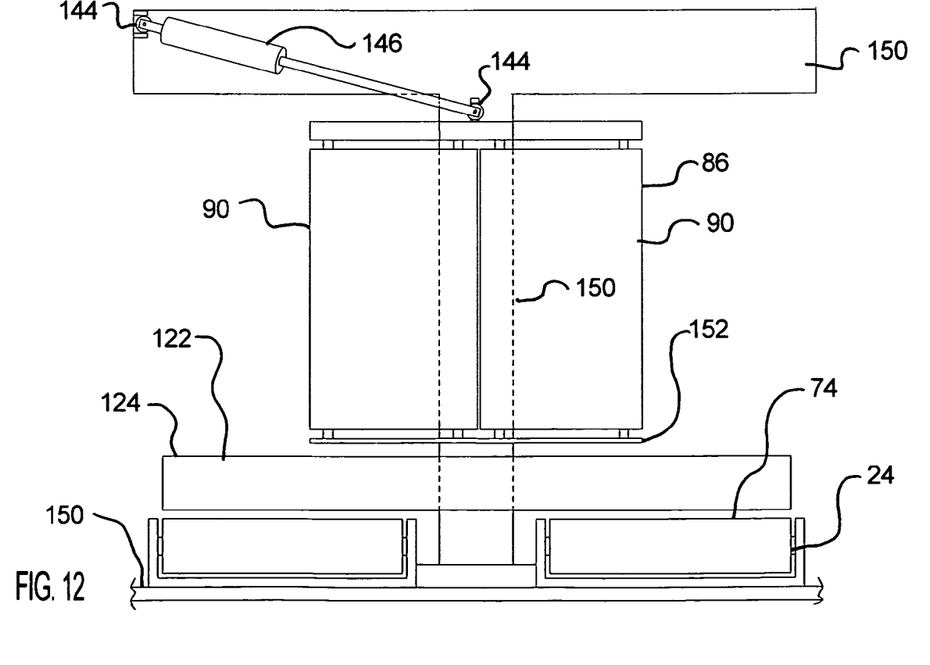
FIG. 12 is a front view of a pivotable V-belt assembly and supporting structure.

FIG. 11 and FIG. 12 show a means whereby the V-belt assembly is pivotable as a unit wherein the orientation of the V-belt assembly sections (90) relative one another may remain constant.

FIG. 11 and FIG. 12 show the V-belt assembly (86) supported by a frame (100) having a longitudinal strut (114), having an end (104) with a pivot point (102) and an opposite end (106). Proximal the pivot point end (104) is a major cross piece having opposing ends (112) and disposed substantially perpendicularly to the longitudinal strut (114). The opposing ends (112) of the major cross piece (110) communicate with the V-belt assembly conveyor sections (90) proximal the V-belt assembly spaced apart ends (96). The frame (100) also comprises a minor cross piece (116), having opposite ends, oriented substantially perpendicularly to the longitudinal strut (114) proximal the opposing frame end (106).

The minor cross piece (116) opposing ends (118) communicate with the V-belt assembly conveyor sections (90) proximal the V-belt assembly apex (88).

FIG. 11 and FIG. 12 additionally show that the V-belt assembly (86) depends from the frame (100) with support points being proximal the major cross piece ends (112) and the minor cross piece ends (118).

In addition, the V-belt assembly (86) may comprise a base plate (152) having a base plate flange (154). Also shown are frame elements (150) which supportingly communicate with the V-belt assembly (86). Particularly depicted are hinges (148) rotatably communicating with the frame (100) at pivot point (102) and with the base plate flange (154) at a base plate flange pivot point (158). Thus, the V-belt assembly may be supported by the base plate flange (154) which is attached to frame element (150) by hinge (148) at pivot point (158).

Further, FIG. 11, FIG. 12, FIG. 12A, and FIG. 12B show a pivot cylinder (146) communicating with the frame element (150) and the frame (100) at attachment points (144). Now, those skilled in the art will readily appreciate that said attachment points may comprise well known means, in example universal joints, whereby elements of the pivot cylinder (146), the frame elements (150), and the frame (100) may articulate each relative the other at said attachment points (148). Thus, as in FIG. 11, by extensive or retractive force applied by pivot cylinder (146), the V-belt assembly (86) may be pivoted to accomplish previously described obstructive and/or separative functions.

Figure 13:
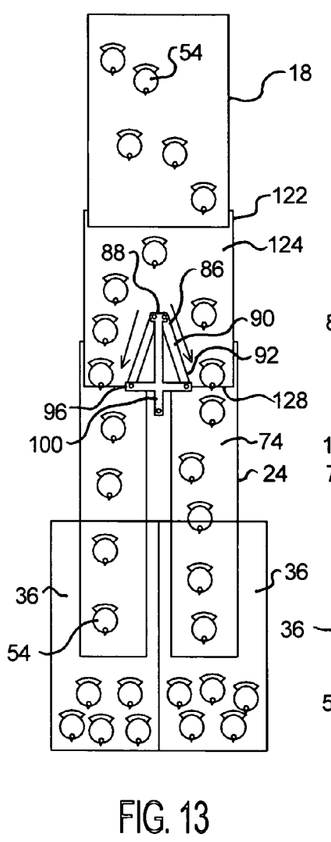
FIG. 13 is a top view of the device having a pivotable V-belt assembly.

FIG. 13 shows the instant art functioning as previously described where fowl (54) are conveyed by the top section (18), to the drop belt section (22), to the auto-loader section (24) and into the coops (36). The V-belt assembly is oriented to direct fowl (54) either to one side of the drop belt section (122) or the other so that the fowl (54) are deposited onto one auto-loader section conveyor belt (74) or another (74) with fowl (54) being simultaneously transferred to a plurality of auto-loader section conveyor belts (74) and simultaneously loaded into a plurality of coops (36).

Figure 13A:
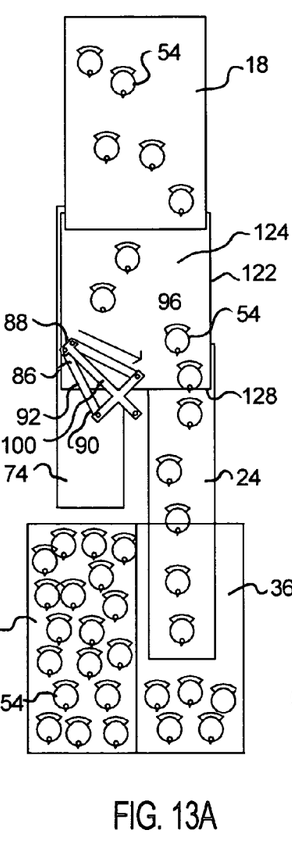
FIG. 13A is a top view of the device showing a pivoted V-belt assembly.
Figure 13B:
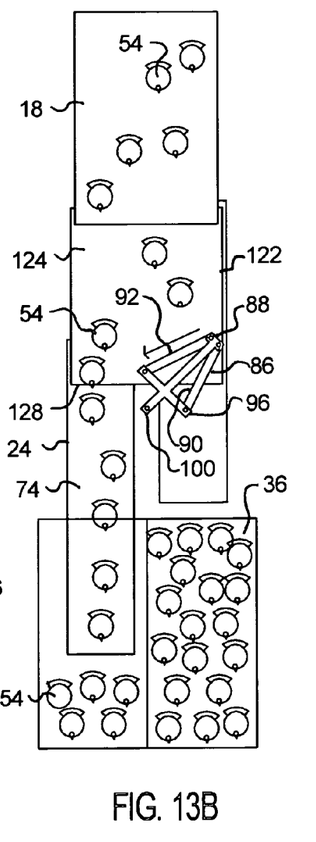
FIG. 13B is a top view of the device showing a pivoted V-belt assembly.

Should one coop (36) be filled before another (36), FIG. 13A shows that the V-belt assembly (86) may be pivoted, as shown in FIG. 11, so that one side of the drop belt section (122) may be obstructed so that livestock (54) are blocked from communication with a portion of the drop belt section end (128) while they are urged to a portion of the drop belt section end (128) in communication with one of the auto-loader section conveyor belts (74). Therefore, it may be understood that livestock (54) may be deposited onto one auto-loader section conveyor belt (74) only. Thus, the instant art may be configured so that only one coop (36) is loaded. In addition, FIG. 13A along with FIG. 13B shows that the V-belt assembly (86) can be pivoted so that either side of the drop belt section (122) is blocked so that particular auto-loader section conveyor belts (74), but not others (74) may receive livestock (54) for loading.

Figure 12A:
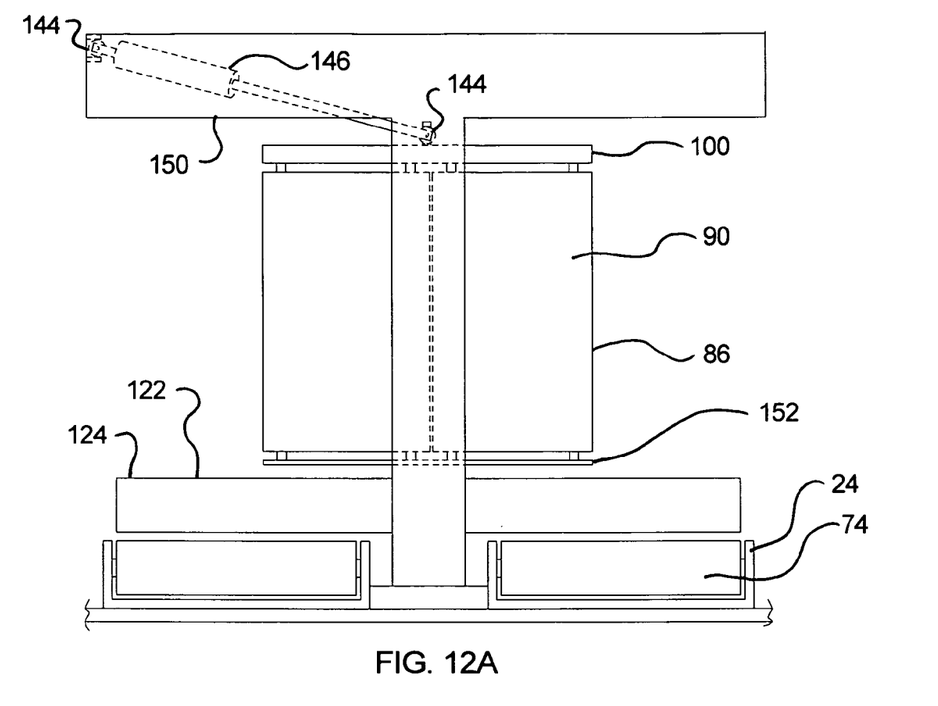
FIG. 12A is a back view of a pivotable V-belt assembly and supporting structure.
Figure 12B:
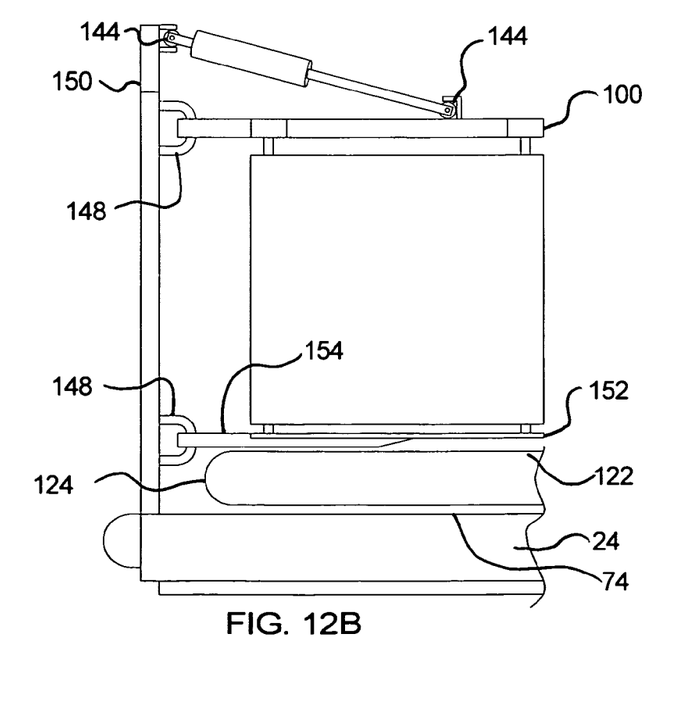
FIG. 12B is a side view of a pivotable V-belt assembly and supporting structure.

FIG. 12A shows an arrangement of supporting structure for the V-belt assembly (86) comprising the V-belt assembly support frame (100) which is pivotable about at least one axis as previously recited. Depending from the V-belt assembly support frame (100) is a V-belt section frame (126) from which depends the V-belt assembly conveyor sections (90), which as previously taught, may be pivoted independently of each other about at least one axis.

Therefore, it is readily apparent that the V-belt assembly (86) may be pivoted while the V-belt assembly conveyor sections (90) are not pivoted, at least one V-belt section (90) may be pivoted about at least one axis while the V-belt assembly is not pivoted, and/or the V-belt assembly (86) may be pivoted about at least one axis while at least one V-belt assembly conveyor section (90) is pivoted about at least one axis.

Those well versed in the art will readily appreciate that the above described means to restrict the communication of livestock (54) to particular portions of the swing belt section end (72) by manipulation of the V-belt assembly (86) and/or individual elements thereof, may function well, if not equally by substitution of the dividing element (132) that may be pivoted about at least one axis and/or having sides (140) that are independently pivotable about at least one axis as in FIG. 9D, FIG. 9E, FIG. 9F, FIG. 9G, and FIG. 9H.

Thusly, by the above provisions, the loading of livestock may be made more efficient, thereby advancing the art.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A machine for loading livestock via conveyor belts, comprising:
    a main conveyor section comprising a conveyor belt, and having a lift section and a top section, the main conveyor section conveyor belt traversing the lift section and the top section,
        said lift section and top section joined and articulated each relative to each other,
        the top section being extendable or retractable, and the main conveyor section being raisable or lowerable;
    the machine also comprising a major assembly comprising the top section, a swing belt section depending from and communicating with said top section, and an auto-loader section depending from the swing belt section,
    such that the swing belt section is disposed between the top section and the auto-loader section, and can communicate with both the said auto-loader section and the top section,
    and such that the top section, the swing belt section, and the auto-loader section comprise conveyor belts independent of one another and independently variable in speed of travel, direction of travel, extension, retraction, or length each relative to the other,
        the auto-loader section comprising a plurality of independent conveyor belts configured essentially side-by-side, each auto-loader section conveyor belt independent of the others and independently variable in speed of travel, direction of travel, extension, retraction, or length of each relative to the other,
        said auto-loader section conveyor belts being independently extendable or retractable,
        said swing belt section being pivotable to alternately communicate with any one or another of the plurality of auto-loader section conveyor belts.

2. A machine as in claim 1 having a pre-loader not integral to any other element, said pre-loader comprising an independent and independently variable in speed of travel, direction of travel, extension, retraction, or length, conveyor belt, said pre-loader able to communicate with the main conveyor section.

3. A machine as in claim 1 communicating with a trailer whereby said machine may be moved from place to place.

4. A machine as in claim 1 having a dividing element communicating with the swing belt section wherein the dividing element restricts communication of livestock with particular portions of the swing belt section, wherein the dividing element comprises one or more dividing element sides and wherein the dividing element is pivotable about at least one axis and alternately or concurrently, at least one dividing element side is pivotable about at least one axis, wherein at least one dividing element side is substantially perpendicular to the swing belt section.

5. A machine as in claim 4 wherein the dividing element comprises a V-belt assembly wherein one or more dividing element sides comprises one or more V-belt assembly conveyor sections, each said V-belt assembly conveyor section comprising one or more rollers and one or more conveyor belts supported by said one or more rollers, said one or more rollers independently variable as to speed or direction of rotation,
  wherein the V-belt assembly is pivotable about at least one axis,
  wherein alternately or concurrently, one or more V-belt assembly conveyor section is pivotable about at least one axis,
  and wherein the V-belt assembly is disposed such that at least one V-belt assembly conveyor section is essentially perpendicular to the swing belt section.

6. A machine for loading livestock via conveyor belts comprising:
  a main conveyor section comprising a conveyor belt and having a lift section and a top section, the main conveyor section conveyor belt traversing the lift section and the top section,
  said lift section and top section joined and articulated relative to each other,
  the top section being extendable and retractable, and the main conveyor section being raisable or lowerable;
  the machine also comprising a major assembly comprising the top section, a swing belt section depending from and communicating with said top section, and an auto-loader section depending from the swing belt section,
    such that the swing belt section is disposed between the top section and the auto-loader section, and communicates with both the said auto-loader section and the top section,
    and such that the top section, the swing belt section, and the auto-loader section comprise conveyor belts independent of one another and independently variable in speed of travel, direction of travel, extension, retraction, or length each relative to the other,
    the auto-loader section comprising a plurality of conveyor belts, configured essentially side-by-side, each auto-loader section conveyor belt independent of each other, and each auto-loader section conveyor belt variable independently of each other in speed of travel, direction of travel, or length,
      said auto-loader section conveyor belts being independently extendable and retractable,
  said swing belt section being pivotable to alternately communicate with any one or another of the plurality of auto-loader section conveyor belts,
  and also having a pre-loader not integral to any other element, said pre-loader comprising a conveyor belt independent and independently variable in speed of travel, direction of travel, extension, retraction, or length relative to any other conveyor belt, said pre-loader able to communicate with the main conveyor section,
  the machine further communicating with a trailer whereby said machine may be moved from place to place, and
  having a dividing element comprising at least one V-belt assembly comprising one or more V-belt assembly conveyor sections, each said V-belt assembly conveyor section comprising one or more rollers and one or more conveyor belts supported and driven by said one or more rollers, each of said rollers independently variable as to speed and direction of rotation, wherein the V-belt assembly is pivotable about at least one axis and alternately or concurrently wherein one or more said V-belt assembly conveyor section is pivotable about at least one axis, and
  wherein the V-belt assembly is disposed such that at least one V-belt assembly conveyor section is essentially perpendicular to the swing belt section.

7. A process for loading livestock onto a transport vehicle via conveyor belts, the transport vehicle comprising livestock containment structures arranged in tiers and columns, by means of a machine comprising:
  a pre-loader not integral to any other element, said pre-loader comprising an independent and independently variable, in speed of travel, direction of travel, extension, retraction, or length, conveyor belt, said pre-loader able to communicate with the main conveyor section,
  a trailer whereby the trailer may be moved from place to place,
  a main conveyor section comprising a conveyor belt, and having a lift section and a top section, the main conveyor section conveyor belt traversing the lift section and the top section,
    said lift section and top section joined and articulated each relative to each other,
    the top section being extendable or retractable, and the main conveyor section being raisable or lowerable;
  the machine also comprising a major assembly comprising the top section, a swing belt section depending from and communicating with said top section, and an auto-loader section depending from the swing belt section,
  such that the swing belt section is disposed between the top section and the auto-loader section, and can communicate with both the said auto-loader section and the top section,
  and such that the top section, the swing belt section, and the auto-loader section comprise conveyor belts independent of one another and independently variable, in speed of travel, direction of travel, extension, retraction, or length, each relative to the other,
    the auto-loader section comprising a plurality of independent conveyor belts configured essentially side-by-side, each auto-loader section conveyor belt independent of each other and each auto-loader section conveyor belt variable independently, in speed of travel, direction of travel, extension, retraction, or length, of each other,
    said auto-loader section conveyor belts being independently extendable or retractable,
    said swing belt section being pivotable to alternately communicate with any one or another of the plurality of auto-loader section conveyor belts,
  this process comprising the steps of:
  step (a) orienting the machine such that the major assembly communicates with a plurality of containment structure columns and by being raised or lowered, communicates with all tiers comprising said columns,
  step (b) herding livestock onto the pre-loader and via the pre-loader, transporting and transferring the livestock to the main conveyor section,
    said main conveyor section then transporting said livestock along the lift section to the top section of said main conveyor section,
    said top section communicating with and transferring said livestock to the swing belt section,
    said swing belt section communicating with and transferring said livestock to the auto-loader section having a plurality of substantially side by side conveyor belts,
  step (c) pivoting the said swing belt section so as to communicate with one of the plurality of the auto-loader section conveyor belts and transferring the livestock thereto,
  step (d) extending the said auto-loader section conveyor belt into a containment structure to be loaded,
  step (e) depositing the livestock therein, step (f) withdrawing the said auto-loader conveyor belt from the containment structure as space within is filled with deposited livestock, step (g) swinging the swing belt section to communicate with another of the plurality of auto-loader section conveyor belts, and recommencing loading process via the said other auto-loader section conveyor belt, step (h) repeating the above steps until all animal containment structures in the tier communicable with all auto-loader section conveyor belts are full, step (i) pausing the livestock loading process, step (j) reorienting the major assembly, by raising or lowering the major assembly, and thus the auto-loader section, to communicate with containment structures in another tier comprising the columns communicable with said major assembly in the machine's present location, step (k) repeating the above steps until all containment structures in the columns and tiers communicable with the major assembly in the machine's present location are filled, step (l) pausing the loading process, step (m) moving the transport vehicle to re-align the auto-loader section with columns and tiers comprising empty containment structures on the transport, step (n) repeating the above steps until all the containment structures aboard the transport vehicle are filled.

8. A process for loading livestock onto a transport vehicle via conveyor belts, the transport vehicle comprising livestock containment structures arranged in tiers and columns, by means of a machine comprising:

a main conveyor section comprising a conveyor belt and having a lift section and a top section, the main conveyor section conveyor belt traversing the lift section and the top section, said lift section and top section joined and articulated relative to each other, the top section being extendable or retractable, and the main conveyor section being raisable or lowerable;

the machine also comprising a major assembly comprising the top section, a swing belt section depending from and communicating with said top section, and an auto-loader section depending from the swing belt section, such that the swing belt section is disposed between the top section and the auto-loader section, and may communicate with both the said auto-loader section and the top section, and such that the top section, the swing belt section, and the auto-loader section comprise conveyor belts independent of one another and independently variable, in speed of travel, direction of travel, extension, retraction, or length, each relative to the other, the auto-loader section comprising a plurality of conveyor belts, configured essentially side-by-side, each auto-loader section conveyor belt independent of each other, and each auto-loader section conveyor belt variable independently of each other in speed of travel, direction of travel, extension, retraction, or length, said auto-loader section conveyor belts being independently extendable or retractable, said swing belt section being pivotable to alternately communicate with any one or another of the plurality of auto-loader section conveyor belts, and also having a pre-loader not integral to any other element, said pre-loader comprising an independent and independently variable, in speed of travel, direction of travel, extension, retraction, or length, conveyor belt, said pre-loader able to communicate with the main conveyor section, the machine further communicating with a trailer whereby said machine may be moved from place to place, and having a dividing element communicating with the swing belt section wherein the dividing element restricts communication of livestock with particular portions of the swing belt section, wherein the dividing element comprises one or more sides and wherein the dividing element is pivotable about at least one axis and alternately or concurrently, at least one dividing element side is pivotable about at least one axis, wherein at least one dividing element side is substantially perpendicular to the swing belt section, the process comprising the steps of:

step (a) orienting the machine such that the major assembly communicates with a plurality of containment structure columns and by being raised or lowered, communicates with all tiers comprising said columns, step (b) herding livestock onto the pre-loader and via the pre-loader, transporting and transferring the livestock to the main conveyor section, said main conveyor section then transporting said livestock along the lift section to the top section of said main conveyor section, said top section communicating with and transferring said livestock to the swing belt section, said swing belt section communicating with and transferring said livestock to the auto-loader section having a plurality of substantially side by side conveyor belts, said dividing element diverting livestock either to one side or the other of the swing belt section whereupon livestock are transferred to a plurality of auto-loader section conveyor belts, step (c) extending the said auto-loader section conveyor belts into containment structures to be loaded, step (d) depositing the livestock therein, step (e) withdrawing the said auto-loader conveyor belts from the containment structures as space within is filled with deposited livestock, step (f) pausing the loading process, when all containment structures communicable with all auto-loader section conveyor belts are full, step (g) reorienting the major assembly, by raising or lowering the major assembly, and thus the auto-loader section, to communicate with containment structures in another tier comprising the columns communicable with said major assembly in the machine's present location step (h) repeating the above steps until all containment structures in the columns and tiers communicable with the major assembly in the machine's present location are filled, step (i) pausing the loading process, step (j) moving the transport vehicle to re-align the auto-loader section with columns and tiers comprising empty containment structures on the transport, step (k) repeating the above steps until all the containment structures aboard the transport vehicle are filled.

9. A process as in claim 8 wherein the dividing element is a V-belt assembly and wherein one or more dividing element sides comprise at least one V-belt assembly conveyor section, each said V-belt assembly conveyor section comprising one or more rollers and at least one conveyor belt supported by said one or more rollers, at least one said roller independently variable as to speed or direction of rotation,
  wherein the V-belt assembly is pivotable about at least one axis, and
  wherein alternately or concurrently, at least one V-belt assembly conveyor section is pivotable about at least one axis.

10. A process, as in claim 8, also including the step of pivoting one or more dividing element sides such that livestock are prevented from being transferred to at least one auto-loader section conveyor belt, and, alternately or concurrently,
  pivoting the dividing element about at least one axis such that livestock are prevented from being transferred to at least one auto-loader section conveyor belt.

11. A process as in claim 10 wherein the dividing element comprises a V-belt assembly wherein one or more dividing element sides comprise at least one V-belt assembly conveyor section, each said V-belt assembly conveyor section comprising one or more rollers and at least one conveyor belt supported by said one or more rollers, at least one said roller independently variable as to speed or direction of rotation,
  wherein the V-belt assembly is pivotable about at least one axis, and
  wherein alternately or concurrently, one or more V-belt assembly conveyor section is pivotable about at least one axis.

12. A method of loading livestock onto a transport vehicle via conveyor belts, the transport vehicle comprising livestock containment structures arranged in tiers and columns,
  by means of a machine comprising:
  a main conveyor section comprising a conveyor belt and having a lift section and a top section, the main conveyor section conveyor belt traversing the lift section and the top section,
    said lift section and top section joined and articulated relative to each other,
    the top section being extendable or retractable, and the main conveyor section being raisable or lowerable;
  the machine also comprising a major assembly comprising the top section, a swing belt section depending from and communicating with said top section, and an auto-loader section depending from the swing belt section,
    such that the swing belt section is disposed between the top section and the auto-loader section, and may communicate with both the said auto-loader section and the top section,
    and such that the top section, the swing belt section, and the auto-loader section comprise conveyor belts independent of one another and independently variable, in speed of travel, direction of travel, extension, retraction, or length, each relative to the other,
      the auto-loader section comprising a plurality of conveyor belts, configured essentially side-by-side, each auto-loader section conveyor belt independent of each other, and each auto-loader section conveyor belt variable independently of each other in speed of travel, direction of travel, extension, retraction, or length,
      said auto-loader section conveyor belts being independently extendable or retractable,
  said swing belt section being pivotable to alternately communicate with any one or another of the plurality of auto-loader section conveyor belts,
  and also having a pre-loader not integral to any other element, said pre-loader comprising an independent and independently variable, in speed of travel, direction of travel, extension, retraction, or length, conveyor belt, said pre-loader able to communicate with the main conveyor section,
  the machine further communicating with a trailer whereby said machine may be moved from place to place, and
  having a dividing element communicating with the swing belt section wherein the dividing element restricts communication of livestock with particular portions of the swing belt section, wherein the dividing element is a V-belt assembly wherein one or more dividing element sides comprise at least one V-belt assembly conveyor section, each said V-belt assembly conveyor section comprising one or more rollers and at least one conveyor belt supported by said one or more rollers, at least one said roller independently variable as to speed or direction of rotation,
  wherein the V-belt assembly is pivotable about at least one axis, and
  wherein alternately or concurrently, one or more V-belt assembly conveyor sections is pivotable about at least one axis,
  the method comprising the steps of:
  step (a) orienting the machine such that the major assembly communicates with a plurality of containment structure columns and by being raised or lowered, communicates with all tiers comprising said columns,
  step (b) herding livestock onto the pre-loader and via the pre-loader, transporting and transferring the livestock to the main conveyor section,
  said main conveyor section then transporting said livestock along the lift section to the top section of said main conveyor section,
  said top section communicating with and transferring said livestock to the swing belt section,
  said swing belt section communicating with and transferring said livestock to the auto-loader section having a plurality of substantially side by side conveyor belts,
  said dividing element essentially randomly diverting livestock either to one side or the other of the swing belt section whereupon livestock are transferred to a plurality of auto-loader section conveyor belts,
  step (c) extending the said auto-loader section conveyor belts into containment structures to be loaded,
  step (d) depositing the livestock therein,
  step (e) withdrawing the said auto-loader conveyor belts from the containment structures as space within is filled with deposited livestock,
  step (e1) should any containment structures be filled before another or others, pivoting one or more dividing element side comprising V-belt assembly conveyor sections in such a way that livestock are obstructed from being transferred to at least one auto-loader section conveyor belt and thusly being prevented from being loaded into full containment structure, and, alternately or concurrently,
  pivoting the dividing element comprising a V-belt assembly about at least one axis such that livestock are obstructed from being transferred to at least one auto-loader section conveyor belt and thusly prevented from being loaded into full containment structure,
  step (f) pausing the loading process, when all containment structures communicable with all auto-loader section conveyor belts are full,
  step (g) reorienting the major assembly, by raising or lowering the major assembly, and thus the auto-loader section, to communicate with empty containment structures in another tier comprising the columns communicable with said major assembly in the machine's present location, step (h) repeating the above steps c-g until all containment structures in the columns and tiers communicable with the major assembly in the machine's present location are filled, step (i) pausing the loading process, step (j) moving the transport vehicle to re-align the auto-loader section with columns and tiers comprising empty containment structures on the transport, step (k) repeating the above steps 1-j until all the containment structures aboard the transport vehicle are filled.

13. A machine for loading livestock via conveyor belts comprising:

a main conveyor section comprising a conveyor belt and having a lift section and a top section, the main conveyor section conveyor belt traversing the lift section and the top section, said lift section and top section joined and articulated relative to each other, the top section being extendable and retractable, and the main conveyor section being raisable or lowerable;

the machine also comprising a major assembly comprising the top section, a drop belt section depending from and communicating with said top section, and an auto-loader section depending from the drop belt section, such that the drop belt section is disposed between the top section and the auto-loader section, and communicates with both the said auto-loader section and the top section, and such that the top section, the drop belt section, and the auto-loader section comprise conveyor belts independent of one another and independently variable in speed of travel, direction of travel, extension, retraction, or length each relative to the other, the auto-loader section comprising a plurality of conveyor belts, configured essentially side-by-side, each auto-loader section conveyor belt independent of each other, and each auto-loader section conveyor belt variable independently of each other in speed of travel, direction of travel, or length, said auto-loader section conveyor belts being independently extendable and retractable, and also having a pre-loader not integral to any other element, said pre-loader comprising a conveyor belt independent and independently variable in speed of travel, direction of travel, extension, retraction, or length relative to any other conveyor belt, said pre-loader able to communicate with the main conveyor section, the machine further communicating with a trailer whereby said machine may be moved from place to place, and having a dividing element comprising a V-belt assembly comprising one or more sides having one or more V-belt assembly conveyor sections, each said V-belt assembly conveyor section comprising one or more rollers and one or more conveyor belts supported by said one or more rollers, each said roller independently variable as to speed and direction of rotation, wherein the V-belt assembly is pivotable about at least one pivot point, and wherein the V-belt assembly is disposed such that at least one V-belt assembly conveyor section is essentially perpendicular to the drop belt section.

* * * * *